United States Patent [19]
Makineni

[11] Patent Number: 5,771,183
[45] Date of Patent: Jun. 23, 1998

[54] APPARATUS AND METHOD FOR COMPUTATION OF STICKY BIT IN A MULTI-STAGE SHIFTER USED FOR FLOATING POINT ARITHMETIC

[75] Inventor: Sivakumar Makineni, Sunnyvale, Calif.

[73] Assignee: Intel Corporation, Santa Clara, Calif.

[21] Appl. No.: 672,678

[22] Filed: Jun. 28, 1996

[51] Int. Cl.[6] .................................. G06F 7/00; G06F 7/38
[52] U.S. Cl. .............................. 364/715.04; 364/715.08; 364/745.01; 364/748.05
[58] Field of Search .................... 364/715.04, 715.08, 364/745, 748

[56] References Cited

U.S. PATENT DOCUMENTS

| | | | |
|---|---|---|---|
| 4,782,457 | 11/1988 | Cline | 364/715.04 |
| 4,887,232 | 12/1989 | Wolrich et al. | 364/754 |
| 4,901,263 | 2/1990 | Ho et al. | 364/715.08 |
| 4,999,796 | 3/1991 | DeWitt et al. | 364/715.08 |

*Primary Examiner*—Chuong Dinh Ngo
*Attorney, Agent, or Firm*—Blakely, Sokoloff, Taylor & Zafman

[57] ABSTRACT

Provided is a multi-stage shifter for use in both alignment and normalization shifters that provides faster implementation of the shifting process, requires less hardware and is less complex. One embodiment of the present invention provides a shift controller generating shift controller signals and a multi-stage normalization shifter having distinct multiple stages, coupled to a shift controller and receiving a number for normalization. The multi-stage shifter shifts the input number at predetermined increments at each stage and producing a sticky bit output at each stage that participates in the final sticky bit. These sticky bit outputs are ORed together to produce the final sticky bit. The present invention provides for production of the sticky bit with less hardware without sacrificing performance.

18 Claims, 5 Drawing Sheets

PRIOR ART

APPARATUS AND METHOD FOR COMPUTATION OF STICKY BIT IN A MULTI-STAGE SHIFTER USED FOR FLOATING POINT ARITHMETIC

BACKGROUND OF THE INVENTION

1. Field of the Invention

The present invention relates to data processing systems and, more particularly, to the computation of sticky bit in the floating-point unit of a microprocessor.

2. Description of Related Art

In a typical floating point unit of a microprocessor, the result number is normalized and rounded before stored in the destination register. Normalization is the process of shifting the mantissa of a floating point number to the left such that the leading zeroes are shifted out and the leading bit in the resulting number delivered is always a 1. The process simply requires a left shifter to shift out any leading zeros of a number.

The sequence of normalization of a number is as follows. A number to be normalized typically has a series of leading zeroes preceding the significant bits of the number and a number of insignificant bits trailing after the significant bits from which the sticky bit is computed. Binary shifters are used to shift out the leading zeroes so that the leading bit of the number after normalization is a 1. The shift amount for a given number is equal to the number of leading zeros in the mantissa. The number of significant bits is predetermined, for example 64, and the bit to the right of the significant bits is called the Round Bit. The remaining least significant bits following the round bit are logically ORed together to generate the sticky bit. The significant bits of the mantissa starting from the leading 1 are delivered to the rounding unit.

A conventional approach of generating the sticky bit uses trailing zero detection hardware to compute the number of trailing zeroes in number to be normalized. First, the number of bits to be ORed to form the sticky bit is calculated: (n-m-k) where n equals the number of bits in the number to be normalized, m equals the number of leading zeros, and k equals the number of significant bits including the round bit. If the trailing zero count is greater than or equal to (n-m-k), then the sticky bit is a 0 or else, the sticky bit is a one. It is important to note that the shift count, m, which is the same as the number of leading zeros, will be in a fully decoded form and must be encoded before computing (n-m-k). Thus, this method is very hardware intensive and complex. This computation would require two subtractors, a trailing zero detector and a comparator.

A major problem in present day systems is that the sticky bit cannot be calculated as fast as the time it takes to normalize a given number with a reasonable amount of hardware. One alternative approach that has been tried is the use of a trailing zero anticipator. This technique anticipates the number of trailing zeroes in the number to be normalized before it is calculated. The circuits in the anticipator are very complicated and, used by themselves, are very impractical for producing a sticky bit.

Thus, there presently exists a great need in the data processing industry for an apparatus that will compute a sticky bit that is fast, simple and requires minimal hardware without sacrificing performance. As will be seen, the present invention solves the problems of the prior art in a simple, elegant manner.

SUMMARY OF THE INVENTION

The present invention is a multi-staged number normalizer that computes the sticky bit in parallel with the normalization process of a floating point unit. Unlike prior systems, the present invention is able to compute the sticky bit with a minimum amount of hardware without sacrificing performance.

In one embodiment, the normalization process utilizes a series of shifters, each shifter along with its supporting hardware constituting a separate shifter stage. Each stage is capable of shifting a number by a predetermined increment that is different for each stage. Each shifter in the series is coupled to receive an input number and a shifter control signal and outputs a partially normalized number. A partially normalized number in this context refers to an output from a given shifter after being shifted or not shifted at the increment of that particular stage. Whether a given shifter shifts the number depends on the character of the number in relation to the shifting increment of the shifter. If the number of leading zeroes is greater than or equal to the shifting increment, the number is shifted at the increments of that stage until the number of leading zeroes are less than the particular stage's predetermined increment. The final output of the last stage is a fully normalized binary number with a corresponding round bit and sticky bit with the sticky bit being available at the same time or prior to the normalized result.

Accordingly, a sticky bit generator circuit is provided that is simpler. requires less hardware than systems that are presently available without sacrificing performance.

DETAILED DESCRIPTION OF THE PREFERRED EMBODIMENT

The present invention provides a method and apparatus to perform the computation of a sticky bit in a multistage shifter used for floating point arithmetic. The method can be used for both alignment and normalization processes. A normalization circuit is presented as one embodiment that performs the normalization of a number using multiple shifting stages in the floating point arithmetic unit of a microprocessor.

In one embodiment, the first shifter shifts in increments of 64 bits, the second shifter shifts in increments of 16 bits, the third shifter shifts in increments of 4 bits and the fourth and final shifter shifts in increments of 1 bit. The first shifter initially receives the unnormalized number and shifts in increments of 64 bits on a signal called the shift control.

Each stage is coupled to a separate sticky bit logic circuit. At each stage, the sticky bit can be computed in parallel to the shifting at any particular stage. The last stage is the stage where the last shifting sequence was performed on the number. There is a separate sticky bit logic circuit at each stage that has an output which is ORed together with the three other stages to compute the final sticky bit at the final stage.

In a second embodiment, computation of the sticky bit in the second stage 16 bit shifter is handled differently. The sticky bit is computed in this alternative embodiment using the data inputs of the first shifter, the control inputs of the first shifter and the control inputs of the second shifter. Thus, the sticky bit can be calculated at the second stage without having to wait for the first stage of the normalization circuit to complete its process.

FIGS. 1 through 6 of the drawings disclose various embodiments of the present invention for purposes of illustration. One skilled in the art will recognize alternative embodiments that may be employed without departing from the principles of the invention that are illustrated by the structures and methods described herein. For example, use of the method set forth below in the form of an alignment shifter would still embody the basic principals of the present invention.

Figure 1:
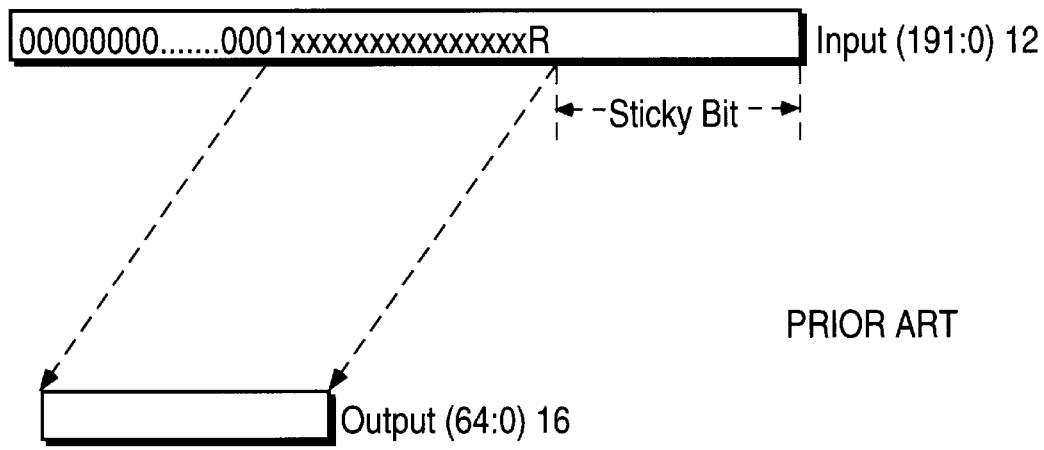
FIG. 1 is an illustration of a normalization process of a typical normalization shifter found in the Prior Art.
Figure 3:
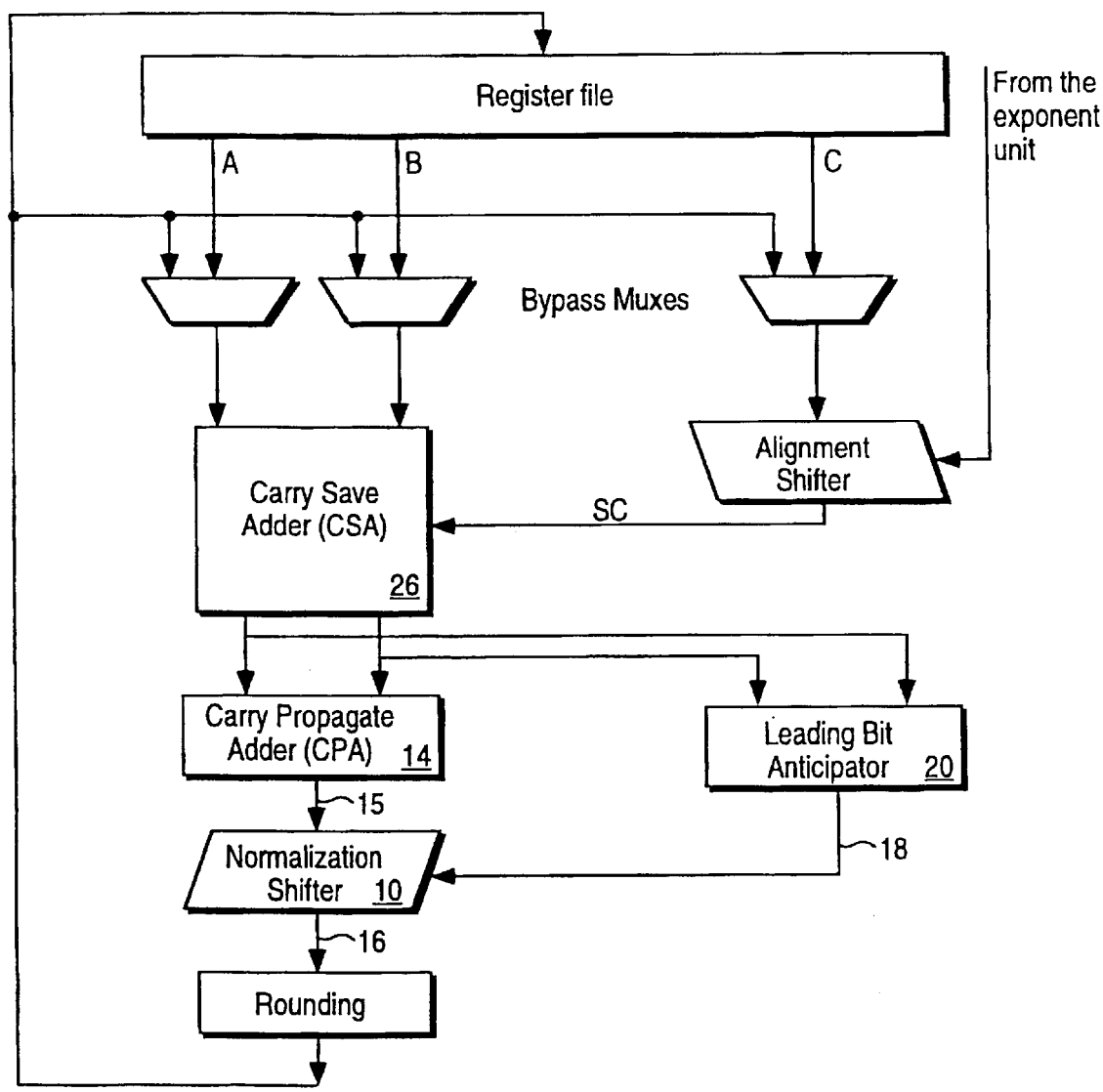
FIG. 3 is a general block diagram of the normalization shifter in a floating point arithmetic unit of a microprocessor in accordance with the present invention.

In floating point operations of a computer, a number is normalized by shifting out leading zeroes. As illustrated in FIG. 1, in one embodiment, the normalization shifter 10 receives a 192-bit binary input number 12. This is the number to be normalized. As can be seen in FIG. 3, the input 12 is the output of the Carry Propagate Adder (CPA) 14. As can be seen in FIG. 1, the number can have a plurality of leading zeroes, a 1 representing the left most significant bit, a round bit representing the right most significant bit, intermediate significant bits between the round bit and the most significant bit and a sticky bit representing the ORed product of the bits to the right of the round bit. The normalization shifter output 16 is a 65-bit normalized number including a round bit.

Figure 2:
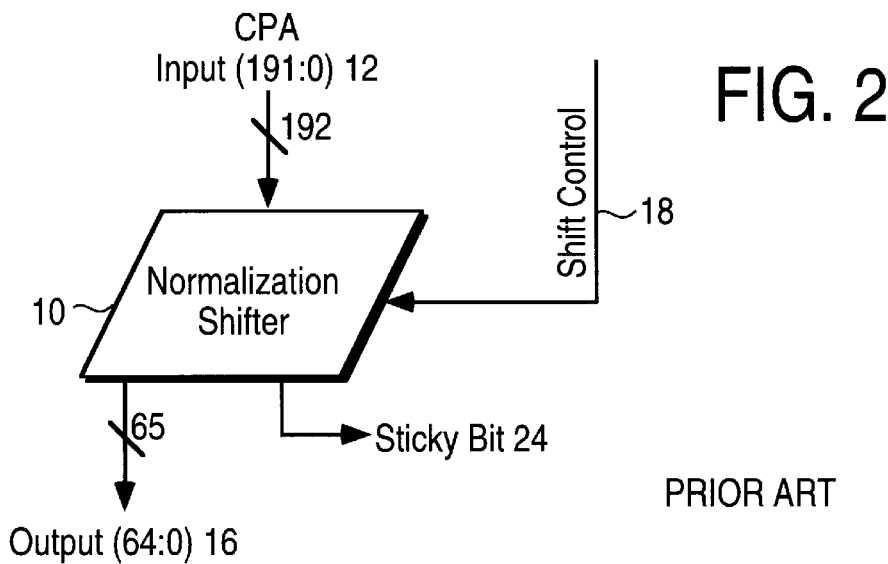
FIG. 2 is a general block diagram of a typical normalization shifter found in the Prior Art.

In general, the normalization shifter 10 in FIG. 2 receives the input 12, which is the output from the CPA 14. Shifting of the input 12 is governed by a shift control circuit 18 which is within the Leading Bit Anticipator (LBA) 20 shown pictured in FIG. 3. This results in a 65-bit normalized output number at the final output 16 and a sticky bit output at sticky bit output 24. It is important to note that the particular parameters for the 192-bit numbers and the 65 bit numbers referred to herein pertain to a particular embodiment for illustration and can be changed to conform to a variety of scenarios calling for different parameters. Also, the shifter itself can be implemented in a number of stages and is not limited to the four-stage shifter described herein. Changes to these parameters would not, however, depart from the spirit and scope of the present invention as described and claimed herein.

Referring now to FIG. 3, one embodiment of the present invention is illustrated within the environment of the floating point arithmetic unit of a microprocessor. The output of the Carry Save Adder (CSA) 26 are two binary numbers that are issued to the CPA 14 and the LBA 20. The CPA 14 performs an arithmetic function on the two numbers producing the 192-bit input number to the normalization shifter. The LBA 20 receives the same two numbers and predicts the number of leading zeroes resulting at the CPA 14 output. The normalization shifter 10 receives the 192-bit input from the output 15 of the CPA 14. The LBA 20, anticipating the number of leading zeroes in the output of the CPA 14, controls the shifting increments of the normalization shifter 10. The technology for making the CSA 26, the LBA 20 and the CPA 14 is well known in the art of microprocessor design are therefore not shown in detail in order not to obscure the described invention. Furthermore, the present invention, although utilizing these components, is not limited by them. Generally, the normalization shifter receives the 192-bit input number 12 from the CPA 14 and also receives control signals from the LBA 20 and shifts the input number in response thereto as described below.

Figure 4:
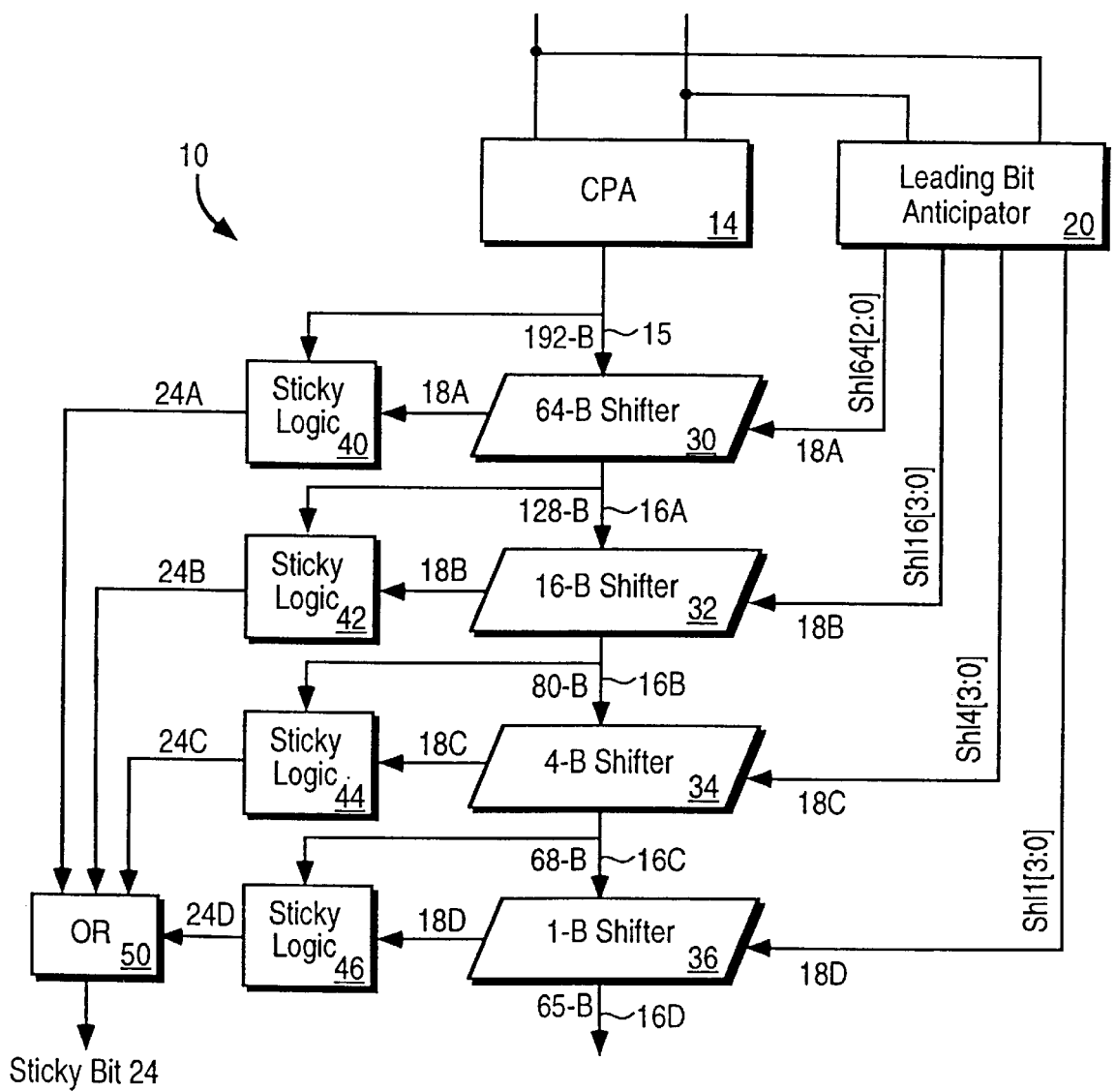
FIG. 4 is a general block diagram of a four level normalization shifter illustrating one embodiment of the present invention.

Referring now to FIG. 4, details of one embodiment of the multi-level normalization shifter embodying the present invention will now be described. Generally, the normalization shifter 10 is a 4-stage shifter, each stage shifting the input number a predetermined increment, in response to the LBA 20, each stage outputting a sticky bit and each stage outputting a partially normalized number. Although the present embodiment disclosed herein is a four stage shifter, different implementations may call for more or less stages of different sizes. Different variations, however, would not vary from the spirit and scope of the present invention as described and claimed herein.

In designing a multistage shifter in accordance with the present invention, once skilled in the art would begin with an input number of a first predetermined size and an output number of a second predetermined size. In order to determine the amount of shifting increments that will be possible at each stage, the designer must start with the final stage, determine the number of shifting increments desired at that last stage and work backwards.

Considering the present embodiment of FIG. 4 as an example, a designer would begin with the final shifter, the 1 bit shifter 36, and determine that the maximum shift will be three bits. This is the most efficient choice because the next to last shifter, before the 4 bit shifter 40 bit shifter, shifts in 4 bits; therefore, it would be redundant to have the final stage shifting by 4 bits. Therefore, the input number to the final stage would be 68 bits (65+3=68).

The designer would then move to the third shifter, the 4 bit shifter 34 and determine that the maximum shift is 12 bits. Similar to the fourth shifter 36, the 12 bit maximum shift would be considered optimum because, since the second shifter 32 shifts by 16 bits, having the third shifter 34 shift by 16 bits would be redundant and inefficient. Therefore, the number of bits in the input number to the third shifter 34 would be 80 (68+12=80).

Similarly, the second shifter, the 16 bit shifter 32, would have a maximum shift of 48. Since the first shifter 30 shifts by 64 bits, the 16 bit shifter 32 is not required to shift 64 bits. The input number, therefore, to the second shifter would be 128 bits (80+48=128).

Finally, the first shifter, the 64 bit shifter 30 would shift at a maximum of 192 bits. This is simply because the input number is a total of 192 bits.

Figure 5:
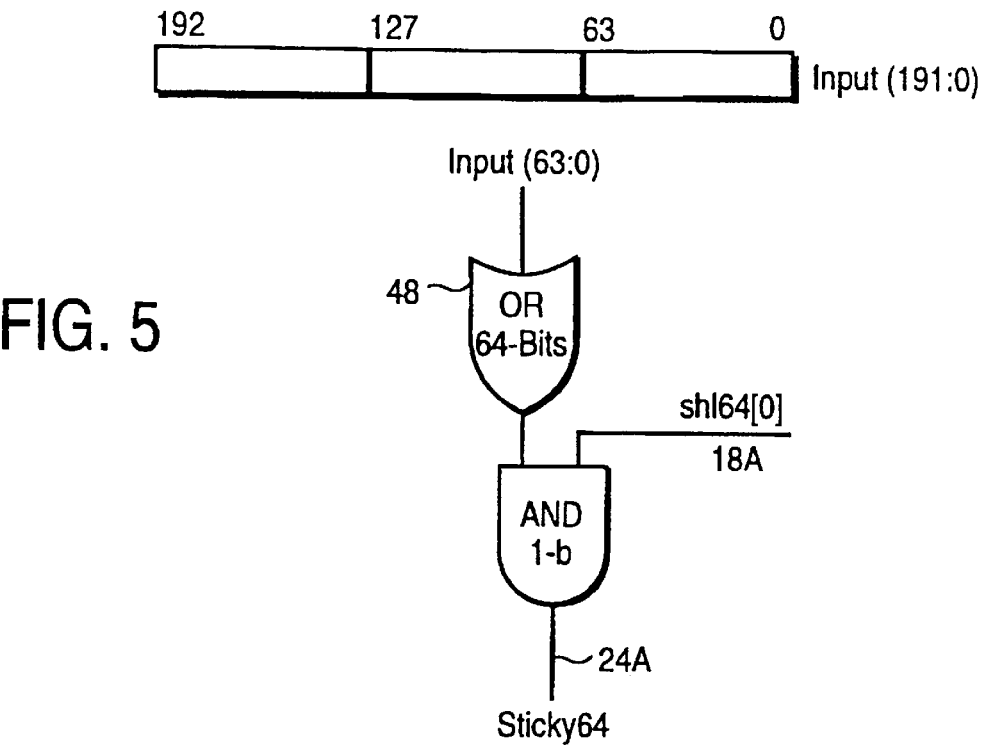
FIG. 5 is a general block diagram of the sticky bit logic circuit of the 64-bit shifter of FIG. 4.

Referring still to FIG. 4 and beginning with the first stage of the multi-stage shifter, the first stage includes a 64-bit shifter 30 coupled to the first input 15, coupled to a first shift control 18A, coupled to a first output 16A and coupled to a first sticky bit logic circuit 40. Details of the sticky bit logic circuit for the 64-bit shifter are shown in FIG. 5. In operation, the first shifter 30 receives the 192-bit input number 12 and shifts the number in increments of 64-bits in response to inputting the number and in response to the first shifting control output 18A. The LBA 20, in receiving the inputs to the CPA 14, predicts whether there will be at least 0, 64, 128, 192 leading zeroes in the 192-bit input number output by the CPA 14 and is ready with a signal at the first shift control circuit to initiate the first shifter. Thus, the first shifter 30 shifts by 0, 64 or 128 bits in response to the first shift controller 18A.

After the first stage completes its function, the output number necessarily has less than 64 consecutive leading zeroes and, since the final output is a 65 bit number including a round bit, the output 16A of the first shifter 30 can be reduced by 64 bits from the right most bit. The first shifter 30 then outputs the left most 128 bits to the next stage of the shifter after the shifting operation of the first shifter. For example, if the first shifter shifts the input data by zero, bits (63:0) cannot make it to the next stage and thus are ORed together with the OR gate 48 of the first sticky bit logic circuit 40 to participate in the sticky bit generation. If the shift count is greater than zero, the sticky bit of this stage is a zero. The final sticky bit is the result of the sticky bit logic outputs 24A through 24D ORed together with OR gate 50. Thus, if the first stage does produce a sticky bit, the sticky bit at the final output 24 of the OR gate 50 will be ready before the shifting process is completed. Of course, although the first sticky bit computation has been completed at this point for stage 1, subsequent stages will necessarily need to compute a sticky bit individually to ensure an accurate sticky bit computation. A key feature of this implementation is a reduction in hardware for computing the sticky bit without sacrificing performance. Subsequent stages in the multi-stage shifter 10 operate similarly.

Still referring to FIG. 4, the second shifter 32, a 16-bit shifter, receives a 128 bit number from the first shifter output 16A of the first shifter 30. Similar to the first shifter, the second shifter 32 receives a 16-bit shifting signal from the second shift control output 18B of the LBA 20 and shifts the 128 bit number in response thereto. The second shifter shifts in increments of 0, 16, 32, or 48 bits. Like the first shifter 30, all the least significant bits that cannot make it to the next stage participate in the sticky bit generation.

After the second shifter 32 performs its process, there are necessarily less than 16 leading zeroes in the resulting number and, since the final output 16D is only 65 bits including a round bit, the output 16B of the second shifter 32 can be reduced by 48 bits. Therefore, the output number of the second shifter is 80 bits. The right most 48 bits which will be unused in the next stage of the shifter will be ORed together to produce the sticky bit. If this stage shifts by 16, then 32 bits are ORed if by 32, 16 bits are ORed and if by 48, 0 bits are ORed.

Figure 6:
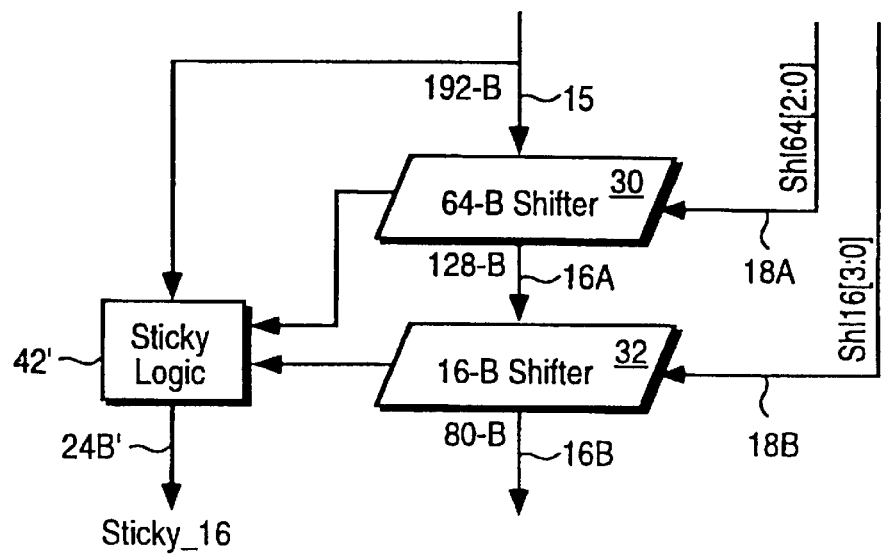
FIG. 6 is a general block diagram of an alternative embodiment of the sticky bit logic circuit of the 16-bit shifter of FIG. 4.

Another embodiment of the present invention includes an alternate method with the related hardware to compute the sticky bit at the second stage of the multi-bit shifter that does not rely on the output of the first shifter 30. The sticky bit at the second stage can be computed from the data inputs to the first shifter, the control inputs of the first shifter and the control inputs of the second shifter. This is illustrated in FIG. 6. The logic circuit used to compute the sticky bit at the second stage of the multi-stage shifter is shown in FIG. 7.

Figure 7:
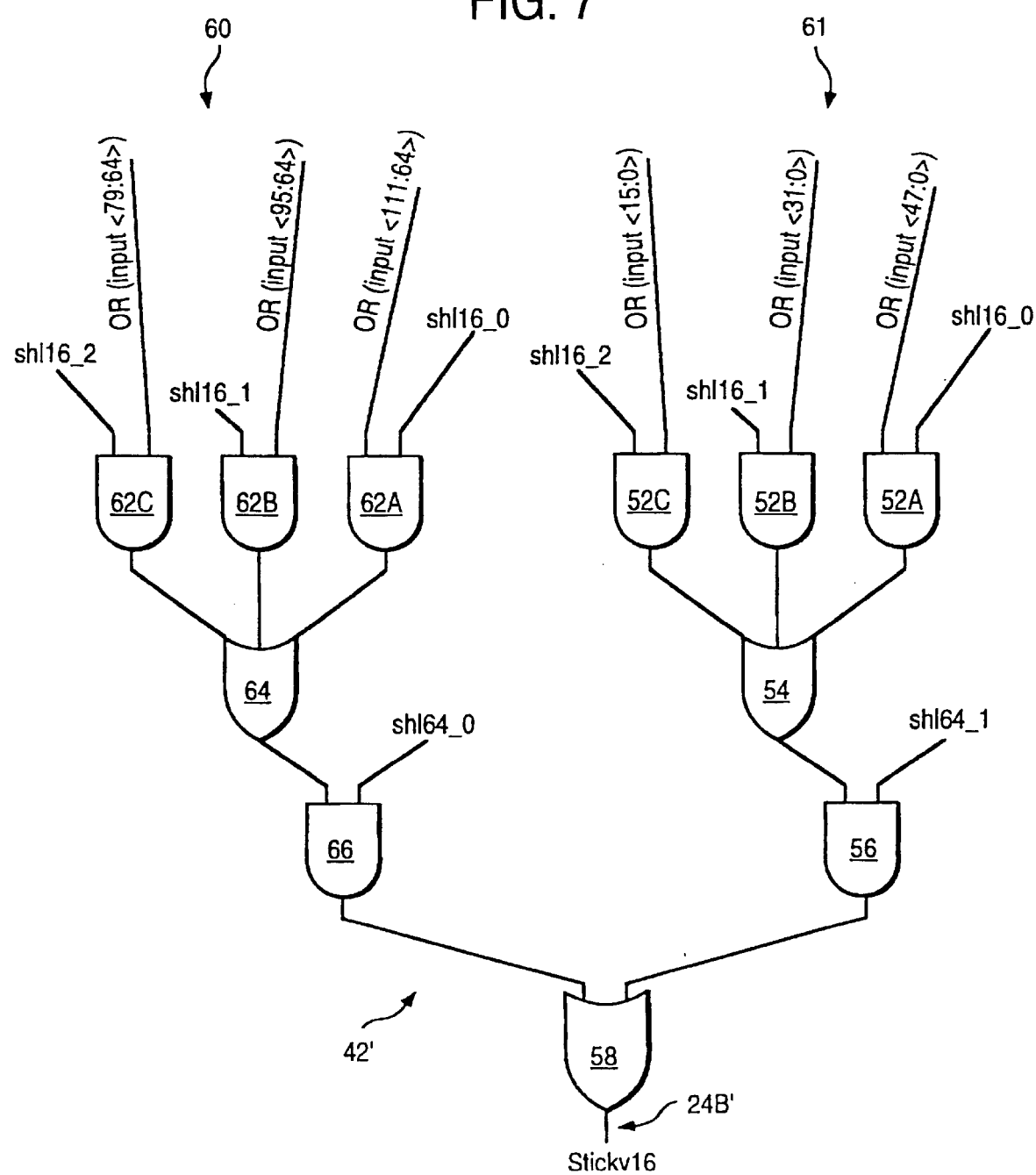
FIG. 7 is a general block diagram of the sticky bit logic circuit of FIG. 6.

Referring now to FIG. 7, the alternate method of computing the sticky bit at the second shifter 32 will now be described.

First, the left portion 60 of the circuit is utilized when there is no shift at the first shifter 30. The left most 128 bits that will have been input to the second shifter is analyzed by the left portion 60. If there is to be no 16 bit shift left at the second shifter, then the input number input <111:64> will necessarily be ORed together to compute the sticky bit. Accordingly, the left portion 60 logically ANDs the result of ORing together the input <111:64> with the shl160 (or no-shift by 16 bits). This result is then logically ANDed with the shl640 (or no-shift by 64 bits) to produce the sticky bit for the second shifter. The process is similar with a shift of 16 or 32 bits.

If there is a single shift of 16 bits with the second shifter 32, the same process is enacted above except the portion of the number being ORed together to produce the sticky bit will be the input <95:64>. Similarly, if there is a double shift left with the second shifter 32 shifting the input number to the left 32 bits, the input <79:64> will be ORed together to produce the sticky bit for the second shifter 32.

The process for the right portion 61 of the circuit is engaged when there is a shl641 (or shift left 64 bits once). The process is similar to that of the left portion 60 except that the portion of the number ORed together is shifted by 64 bits. If there is no shift anticipated for the second shifter 32, the bits input <47:0> are ORed together to compute the sticky bit. If there is one shift with the second shifter, then input <31:0> is ORed and if there are two shifts then input <15:0> is ORed.

In either embodiment of the second shifter 32, the second shifter outputs a second partially normalized number for use in the third stage.

Still referring to FIG. 4, the third shifter 34 receives an 80-bit number from the output 16B of the second shifter 32 and, similar to the first and second shifter, shifts the 80-bit number in increments of 4 bits or 0, 4, 8 or 12 bits in response to the third shift controller 18C of the LBA 20. Similar to the first and second shifter, if the third shifter 34 shifts the number by zero, a sticky bit is produced at this stage using the third sticky bit logic circuit 44 to produce a sticky bit at the third sticky bit output 24C. The right most 12 bits from the 80-bit number would then be ORed together to produce the sticky bit at the third stage if the shift amount is zero. If the third shifter 34 shifts by 4, 8 bits are ORed, if it shifts by 8, 4 bits are ORed and if it shifts by 12, 0 bits are ORed. After the third shifter 34 performs its process, there are necessarily less than 4 leading zeroes in the third partially normalized number and since the final output 16D is only 65 bits including a round bit, the output 16C of the third shifter 34 can be reduced by 12 bits. Therefore, the output 16C of the third shifter is 68 bits. Thus, the third shifter outputs a partially normalized 68-bit number at the third output 16C that is available for the next stage.

In the final stage, the fourth shifter 36 receives the 68-bit number from the fourth shifter output 16C and shifts the number in increments of 1 bit in response to the fourth shift controller 18B in the LBA 20. Again, similar to the first three stages, if the fourth shifter shifts by zero, the remaining 3 unused bits are ORed together to produce the sticky bit using the fourth sticky bit logic circuit 46 which is output at the fourth sticky bit output and ORed together with the other sticky bit outputs 24A through 24C to produce the final sticky bit 24. If the fourth shifter shifts by 1, 2 bits are ORed, if by 2, 1 bit is ORed, if by 3, 0 bits are ORed. The final normalized number is output by the fourth shifter at the fourth shifter output 16D. This is a 65-bit normalized number.

The following is an example of an actual number that would be normalized in the previously described embodiment. An input number is as follows:

| 18 leading zeroes | 64 bits | 110 bits |
|---|---|---|
| 000 . . . 000 | 1101111011 . . . 011 | 1011 . . . 011 |

This represents a 192-bit input number.

In the first stage, the first shifter inputs the 192-bit number. Since there are less than 64 zeroes leading the left most significant bit, there is no shift at this stage. The right most 64 bits (63:0) are ORed together with the first sticky bit logic circuit 40 to produce a sticky bit at the first sticky bit output 24A. Since there are 1's in the right most bits being ORed, a sticky bit is produced. The sticky bit is received by the OR gate 50 producing a sticky bit 24. Thus, we now have a sticky bit before the number is completely normalized. The first shifter 30 then outputs the left most 128 bits.

At stage 2, the second shifter 32 receives the 128-bit number. Since there are 18 leading zeroes in the number, the second shifter 32 shifts 16 bits to the left. The least significant 32 bits are then ORed to produce a sticky bit. This second shifter then outputs the left most 80 bits of the number.

At stage 3, the third shifter 34 receives the 80-bit number. No shift occurs because there are less than four leading zeroes at this point. The right most 12 bits are ORed together to produce the sticky bit with the third sticky bit logic circuit 44 and a sticky bit output is produced at the third sticky bit output 24C. The third shifter then outputs the left most 68 bits of the number.

At stage 4, the fourth shifter receives the 68-bit number. The shifter shifts twice in response to the fourth shift controller 18B since there are two leading zeroes left. The single right most bit is ORed to produce a sticky bit. The fourth shifter 36 then outputs the left most 65-bits of the number producing the final normalized number. The sticky bit is already waiting to further computations.

A second example will now be provided to illustrate the alternate method of producing the sticky bit at the second shifter 32. The number example is follows:

$$\underbrace{000\ldots000}_{\text{64 leading zeroes}} \quad \underbrace{1101111011\ldots011}_{\text{65 bits}} \quad \underbrace{1011\ldots011}_{\text{63 bits}}$$

At stage 1, the first shifter 30 inputs the 192-bit number. The number is shifted 64-bits to the left since there are 64 leading zeroes. No sticky bit is produced because there was a shift.

Prior to stage 2, the sticky bit can be produced. The general block diagram showing the process utilizing alternate sticky logic 42' is shown in FIG. 6 with the details of the sticky bit logic circuit 24B' illustrated in FIG. 7. Since there is a shift at stage 1, the right most portion illustrated in FIG. 7 is utilized. The input bits input <47:0> from the input are ORed together. The result is then ANDed with the 16-bit or second shifting signal shl16 0 at the AND gate 52. This second result then ORed with the other shl16 ANDed combinations at the OR gate 54. This third result is then ANDed with the 64 bit shifting signal from the first shift control signal at AND gate 56 and finally ORed together at OR gate 58 with the left section of FIG. 7 to produce the sticky bit from the second stage. Since the resultant number has no more leading zeroes, there is no more shifting at stages 3 or 4 and the left most 65 bits are output at the final stage along with the sticky bit produced at all four stages. From the above description, it will be apparent that the invention disclosed herein provides a novel and advantageous multi-stage normalization circuit and method of operation. As will be understood by those familiar with the art, the invention may be embodied in other specific forms without departing from its spirit or essential characteristics, and thus, the described embodiment is not restrictive of the scope of the invention. The following claims are indicative of the scope of the invention, and all variations which come within the meaning and range of equivalency of the claims are to be embraced within their scope.

What is claimed is:

1. A number normalizer comprising:
    a first input;
    a multistage normalization shifter coupled to the first input to receive an unnormalized number, each stage of the multi-stage normalization shifter including a binary shifter and a sticky bit logic circuit;
    a shift controller circuit coupled to each binary shifter; and
    a logic ORing circuit having a plurality of inputs, each input coupled to at least one of the sticky bit logic circuits of the normalization shifter to logically OR outputs of the stick bit logic circuits to produce a final sticky bit output.

2. A number normalizer according to claim 1, wherein the multi stage normalization shifter includes:
    a first stage having a first shifter for receiving the unnormalized number, the first stage outputting a first partially normalized number and a first stage sticky bit signal; and
    a plurality of stages occurring in series following the first stage wherein each stage includes a shifter for receiving a partially normalized number from a prior stage and a sticky bit logic circuit for generating a sticky bit signal.

3. A number normalizer according to claim 2, wherein a second stage of the plurality of stages of the multi stage normalization shifter includes a second sticky bit output for outputting a second sticky bit signal in response to the partially normalized number of the first stage and an output of a binary shifter of the second stage, and the binary shifter of the second stage for shifting the partially normalized number by a predetermined increment.

4. A number normalizer comprising:
    a first input for receiving an unnormalized number;
    a shift controller for generating shift controller signals; and
    a multi-stage normalization shifter, coupled to the first input to shift out leading zeroes in the unnormalized number and at least one sticky bit generator to produce a sticky bit at each stage wherein the multi-stage normalization shifter generates a normalized number and a final sticky bit in response to the first input and the shift controller signals.

5. A number normalizer circuit according to claim 4 further comprising a plurality of sticky bit generators, each having an input and an output, each computing a sticky bit for a corresponding shifter stage and each for outputting a sticky bit and a logic OR gate for ORing the outputs of the sticky bit generators together.

6. A number normalizer according to the claim 4, wherein the shift controller further comprises a plurality of shift controller outputs, each shift controller output for controlling shifting of the unnormalized number in the normalization circuit in separate predetermined increments, wherein the multi-staged normalization shifter further comprises a plurality of binary shifters, each shifter receiving a shift controller signal from shift controller output, each shifter having a predetermined incremental shifting length and each shifter generating a sticky bit signal in response to shifting of the unnormalized number.

7. A number normalizer according to claim 4, wherein the shift controller circuit comprises:
    a shift controller for producing a first shift controller signal, a second shift controller signal, a third shift controller signal and a fourth shift controller signal;

wherein the multi-stage normalization shifter further comprises:

a first shifter having a first output and for receiving the unnormalized number from the first input and the first controller signal from the shift controller, the first shifter for shifting the unnormalized number a first incremental length in response to the first shift controller signal and for outputting a first partially normalized number and a first sticky bit in response to the first shift controller signal and in response to the unnormalized number;

a second shifter having a second output and for receiving the first partially normalized number from the first output and the second shift controller signal from the shift controller, the second shifter for shifting the first partially normalized number a second incremental length in response to the second shift controller signal and for outputting a second partially normalized number and a second sticky bit in response to the second shift controller signal and in response to the first partially normalized number;

a third shifter having a third output and for receiving the second partially normalized number from the second output and the third shift controller signal from the shift controller, the third shifter for shifting the second partially normalized number a third incremental length in response to the third shift controller signal and for outputting a third partially normalized number and a third sticky bit in response to the third shift controller signal and in response to the second partially normalized number;

a fourth shifter having a fourth output and for receiving the third partially normalized number from the third output and the fourth shift controller signal from the shift controller, the fourth shifter for shifting the third partially normalized number a fourth incremental length in response to the fourth shift controller signal and for outputting a fourth normalized number and a fourth sticky bit in response to the fourth shift controller signal and in response to the third partially normalized number; and a sticky bit ORing generator having an ORing input and receiving and logically ORing the first sticky bit, the second sticky bit, the third sticky bit and the fourth sticky bit and outputting the final sticky bit.

8. A number normalizer according to the claim 4, wherein the shift controller further comprises a plurality of shift controller outputs, each shift controller output for controlling shifting of the unnormalized number in predetermined increments, wherein the multi-staged normalization shifter further comprises a plurality of shifters, each shifter coupled to a separate and distinct shift controller output and each shifter having a predetermined shifting increment, each shifter for shifting the unnormalized number by the respective predetermined shifting increment in response to the respective shift controller output.

9. A number normalizer according to claim 4 further comprising a plurality of sticky bit generators, each having an input communicating with a stage of the multi-stage shifter, each for computing a sticky bit for a corresponding shifter stage, and each having an output for outputting a sticky bit in response to the generating of a sticky bit and in response to the input, and a logic OR gate for logically ORing the outputs of the sticky bit generators together to compute the final sticky bit.

10. A method of normalizing a binary number comprising the steps of:

receiving an unnormalized number at a first input;

generating shift controller signals;

receiving the shift controller signals in a multistage shifter;

shifting the unnormalized number by predetermined increments with the multistage shifter;

computing a sticky bit for each corresponding shifter stage with a sticky bit logic circuit;

outputting a sticky bit output from each sticky bit logic circuit;

ORing the sticky bit outputs together; and generating a normalized number and a final sticky bit in response to the unnormalized number and in response to the shift controller signals.

11. A method of normalizing a binary number according to claim 10 further comprising the step of controlling shifting of the unnormalized number with the multistage shifter by separate predetermined increments with the shift controller signals.

12. A method of normalizing a binary number according to claim 10 further comprising the steps of:

producing a first shift controller signal with a shift controller;

producing a second shift controller signal with a shift controller;

producing a third shift controller signal with a shift controller;

producing a fourth shift controller signal with a shift controller, shifting the unnormalized number a first incremental length with a first shifter in response to the first shift controller signal and outputting a first partially normalized number and a first sticky bit in response to the first shift control and in response to the first input;

shifting the first partially normalized number a second incremental length with a second shifter in response to the second shift controller signal and outputting a second partially normalized number and a second sticky bit in response to the second shift controller signal and in response to the first partially normalized number;

shifting the second partially normalized number a third incremental length with a third shifter in response to the third shift controller signal and outputting a third partially normalized number and a third sticky bit in response to the third shift controller signal and in response to the second partially normalized number;

shifting the third partially normalized number a fourth incremental length with a fourth shifter in response to the fourth shift controller signal and outputting a fourth normalized number and a fourth sticky bit in response to the fourth shift controller signal in response to the third partially normalized number; and receiving and logically ORing with an OR gate the first sticky bit, the second sticky bit, the third sticky bit and the fourth sticky bit, and outputting a final sticky bit.

13. A method of normalizing a binary number according to claim 10, further comprising the steps of controlling shifting of the unnormalized number in separate predetermined increments in response to each shift controller signal and shifting the normalized number by the respective predetermined shifting increment in response to the respective controller output with each shifter.

14. A method of normalizing a binary number according to claim 10, further comprising the steps of:

computing a sticky bit for each stage of the multistage shifter with a corresponding sticky bit generator;

outputting a sticky bit.

15. A method of normalizing a binary number according to claim 10, further comprising the steps of:

computing a sticky bit output for each stage of the multistage shifter with a corresponding sticky bit logic generator;

outputting a sticky bit output for each stage of the multistage shifter;

ORing the sticky bit outputs of each stage of the multistage shifter together to compute a final sticky bit;

generating control signal for controlling shifting of the unnormalized number by predetermined increments;

shifting the unnormalized number by the respective predetermined increments in response to the corresponding control signal with each stage of the multistage shifter.

16. A number normalizer, comprising:

a normalization shifter having a plurality of stages, the normalization shifter to receive an unnormalized number;

a shift controller circuit coupled to each stage of the plurality of stages of the normalization shifter, the shift controller circuit to control the plurality of stages of the normalization shifter; and an OR circuit coupled to each stage of the plurality of stages of the normalization shifter to generate an output sticky bit.

17. The number normalizer of claim 16 wherein each stage of the plurality are arranged in series and include a binary shifter and a sticky bit generator;

a first stage of the plurality of stages to receive the unnormalized number, the binary shifter of the first stage to shift the unnormalized number responsive to the shift controller circuit, the sticky bit generator of the first stage to generate a first sticky bit responsive to the shift controller circuit and the unnormalized number, the first stage generating a first partially normalized number;

at least one succeeding stage of the plurality of stages to receive a partially normalized number from a preceding stage of the plurality of stages, the binary shifter of the succeeding stage to shift the partially normalized number responsive to the shift controller circuit, the sticky bit generator of the succeeding stage to generate a succeeding sticky bit responsive to the shift controller circuit and the partially normalized number from the preceding stage, the succeeding stage generating a succeeding partially normalized number, the first partially normalized number being the partially normalized number that one of said at least one succeeding stages of the plurality of stages is to receive, a final stage of the plurality of stages to receive the succeeding partially normalized number, the binary shifter of the final stage to shift the succeeding partially normalized number responsive to the shift controller circuit, the sticky bit generator of the final stage to generate a final sticky bit responsive to the shift controller circuit and the succeeding partially normalized number, the final stage generating a normalized number, the OR circuit to receive the first sticky bit, the final sticky bit, and the succeeding sticky bit of each succeeding stage and to generate an output sticky bit therefrom.

18. The number normalizer of claim 16 wherein a first stage of the plurality of stages to receive the unnormalized number, the first stage having a binary shifter to shift the unnormalized number responsive to the shift controller circuit, the first stage generating a first partially normalized number, each succeeding stage of the plurality of stages of the normalization shifter includes a binary shifter and a sticky bit generator, at least one succeeding stage of the plurality of stages to receive a partially normalized number from a preceding stage of the plurality of stages, the binary shifter of said at least one succeeding stage to shift the partially normalized number responsive to the shift controller circuit, the sticky bit generator of said at least one succeeding stage to generate a succeeding sticky bit responsive to the shift controller circuit and the partially normalized number, said at least one succeeding stage generating a succeeding partially normalized number, the first partially normalized number being the partially normalized number that one of said at least one succeeding stages of the plurality of stages is to receive, the OR circuit to receive the succeeding sticky bit of each succeeding stage and to generate an output sticky bit therefrom.

* * * * *